Jan. 24, 1967  P. W. JACOBSEN  3,300,114
THREE DIMENSIONAL WEB SHIFTING APPARATUS
Filed Aug. 12, 1964  5 Sheets-Sheet 5
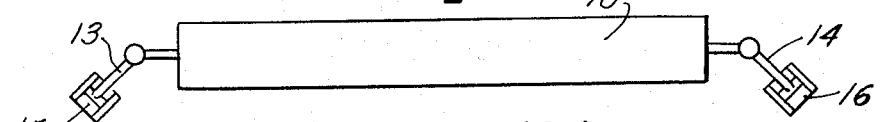
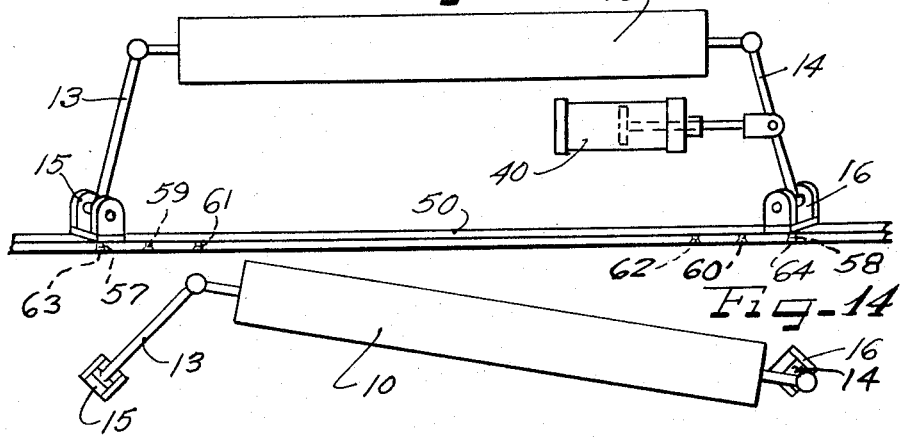
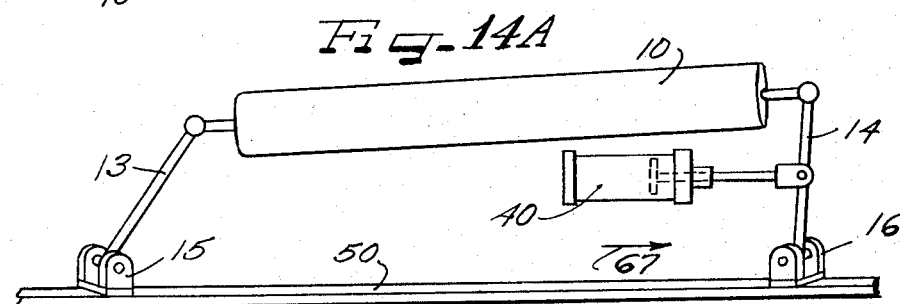
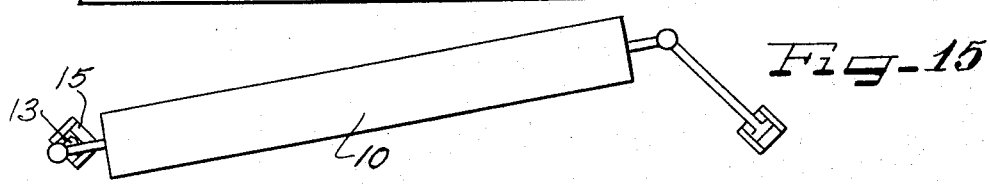
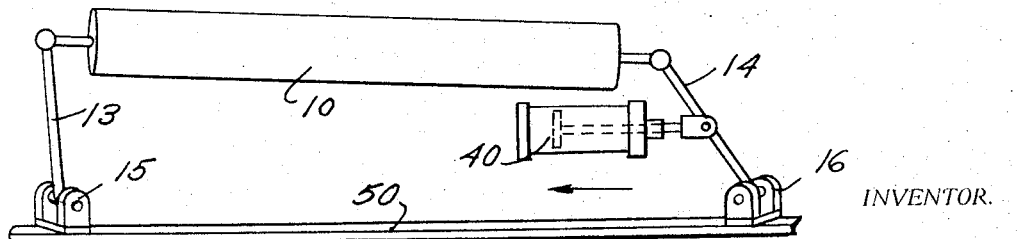
INVENTOR.
PAUL W. JACOBSEN
BY *Hill, Sherman, Meroni, Gross & Simpson* ATTORNEYS

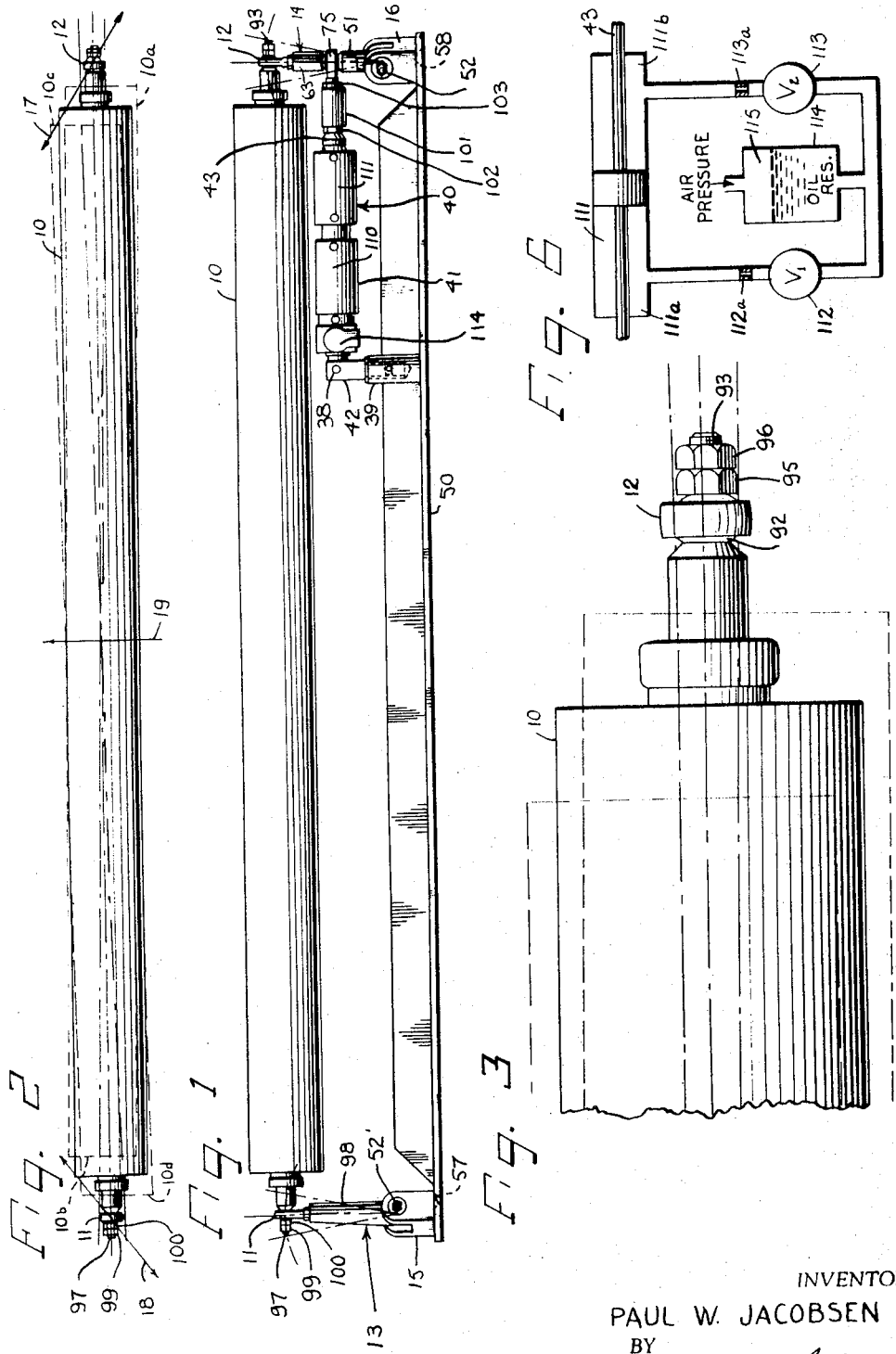

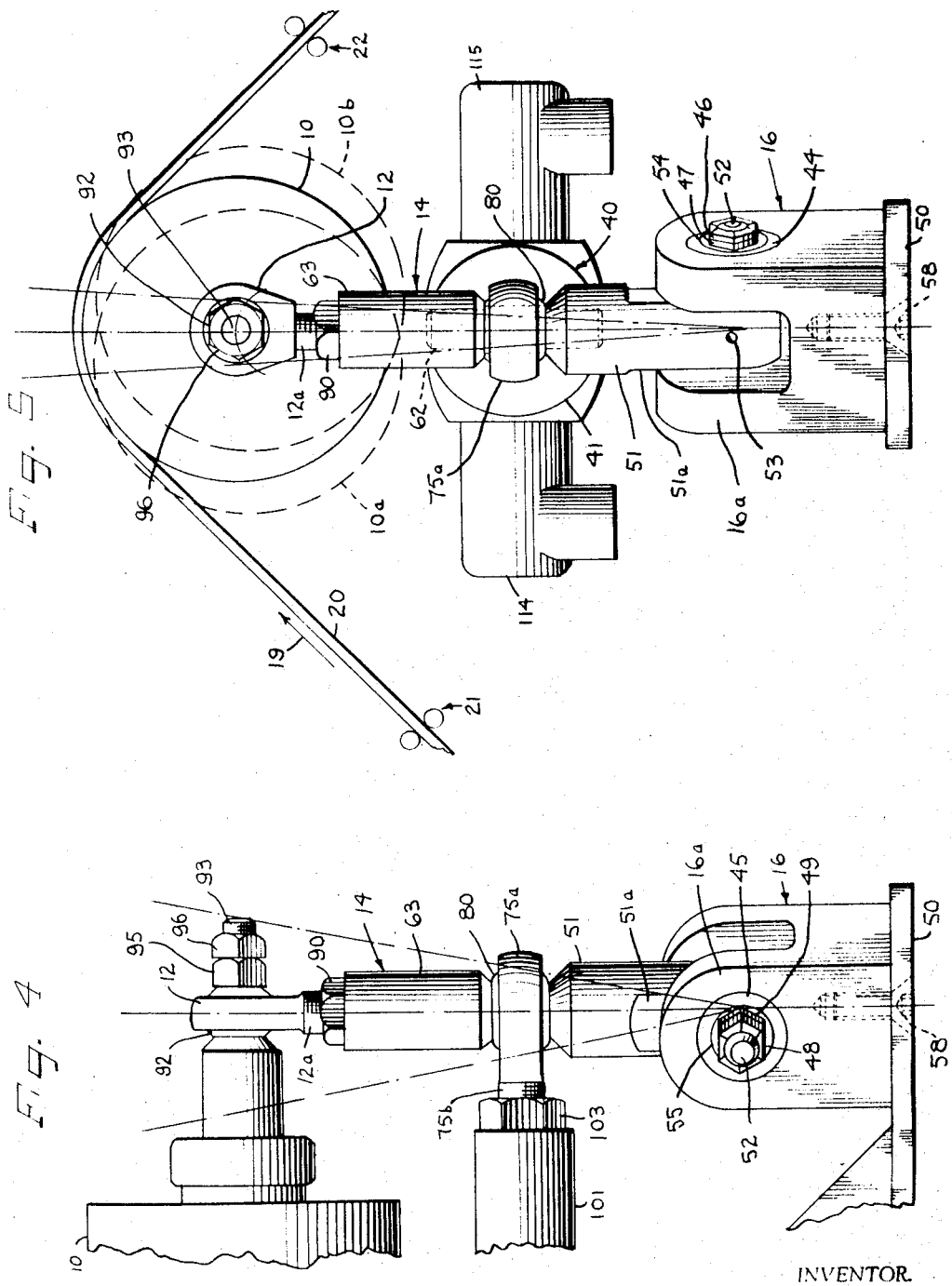

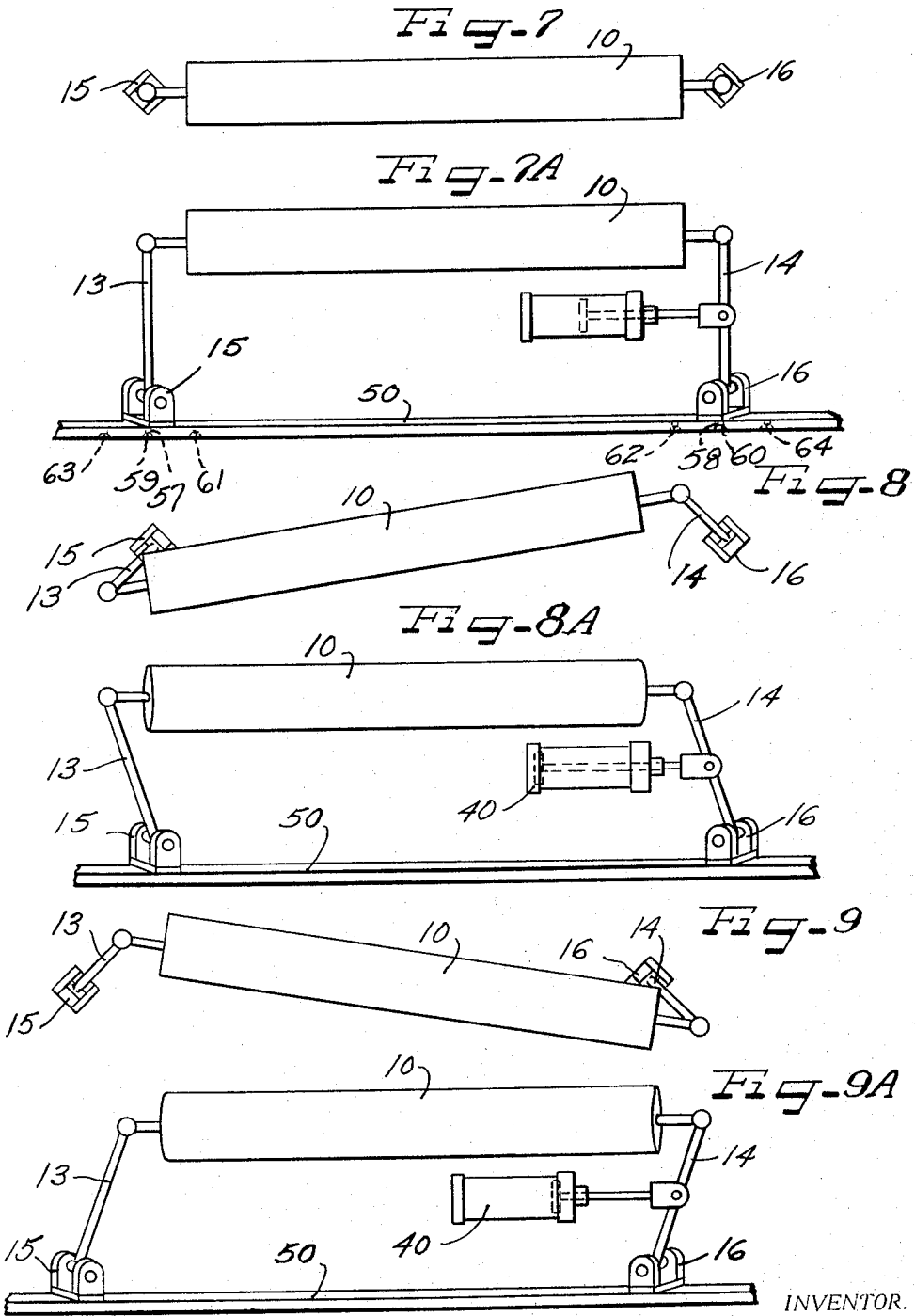

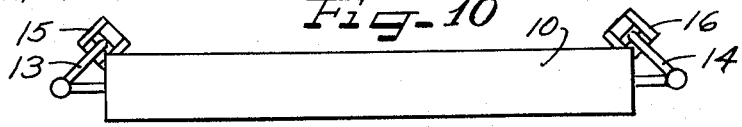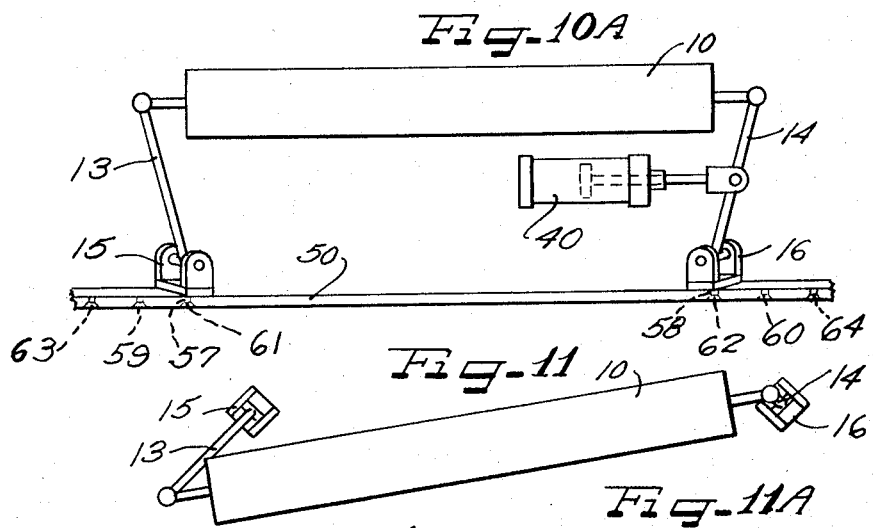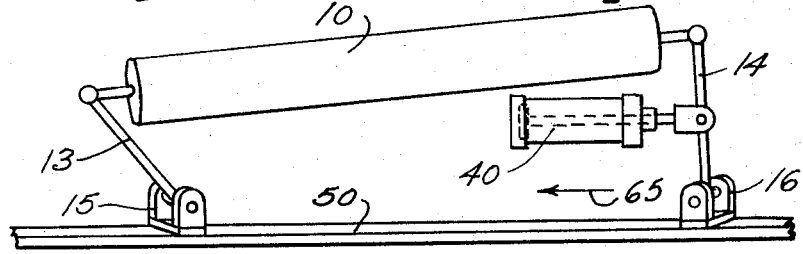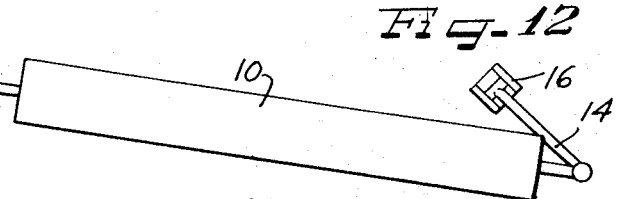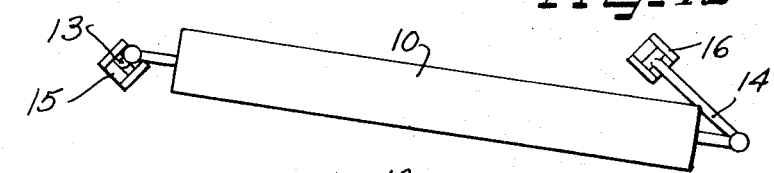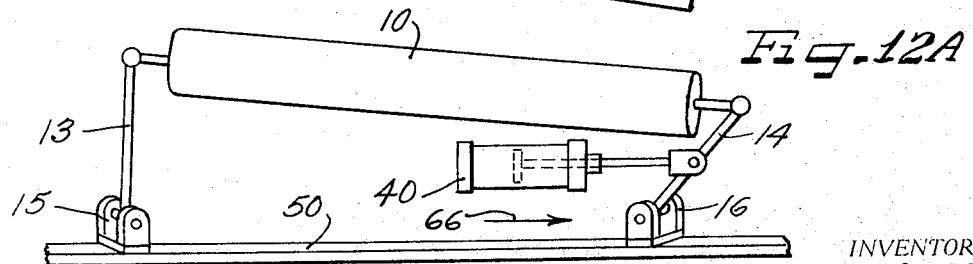

United States Patent Office 3,300,114
Patented Jan. 24, 1967

3,300,114
THREE DIMENSIONAL WEB SHIFTING
APPARATUS
Paul W. Jacobsen, Kiel, Wis., assignor to H. G. Weber and Company, Inc., Kiel, Wis., a corporation of Wisconsin
Filed Aug. 12, 1964, Ser. No. 389,011
4 Claims. (Cl. 226—180)

This invention relates to an edge alignment machine and particularly to a machine for controlling the lateral position of a web by shifting one or more guide means and more particularly to an improvement on the edge alignment machine illustrated in my copending application Serial No. 310,303, now U.S. Patent No. 3,254,818.

The present invention is based on the concept that with increasing misalignment of a web there generally develops a substantial increase in tension of the web at one side thereof at the edge alignment mechanism. In most cases, when the tensions is greater on one side of the web than on the other, the web is substantially more vulnerable to tearing or snapping. However, the means in reducing the increase in tension at one side or the other of a web will vary depending on the composition and texture of the web. Generally, the amount of canting and shifting of an edge aligment roller is in proportion to the unbalance of the tension forces from one side of the web to the other, but in some cases the relation is inversely proportional to the unbalance of the tension forces from one side of the web to the other. In accordance with the present invention, means is provided for reducing the tension of the web particularly in the extremes of edge alignment correction movement of a guide roll mechanism or the like. Also in accordance with the present invention, adjusting means are provided to compensate for different types of web material. The mechanism preferably has components of corrective movement in each of three mutually orthogonal directions.

It is therefore an important object of the present invention to provide an edge alignment mechanism which has a protective tension reducing action at the extremes of its corrective movement for tending to minimize the danger of rupture of the web at the edge alignment station.

It is another object of the present invention to provide an edge alignment mechanism which is extremely simple and effective and which is particularly simple to install on paper machinery and the like.

A further important object of the present invention is to provide an edge alignment mechanism having means tending to prevent tearing of the web and which is very simple and quickly adjusted for differing web conditions and the like.

A still further object of this invention is to provide means which can be easily changed to accommodate different types of web material such as crepe paper, crinkled kraft and some soft materials which do not always behave as expected.

A significant feature of the present invention resides in the provision of an edge alignment mechanism providing for movement to correct for web alignment errors having components in three mutually orthogonal directions.

A more specific feature of the present invention resides in the provision of guide roll means for controlling the position of a web which is mounted for lateral and rotational shifting to correct for web position errors and which is also shiftable in a direction tending to release the tension of the web at the guide roll means particularly at the opposite extremes of the shifting movement of the guide roll means.

Another specific feature of the invention resides in the provision of a radius arm type mount for the guide roll means with the radius arms mounted for pivotal movement in respective planes forming opposite acute angles with respect to the direction of web travel, the acute angles of such planes being simply and rapidly adjustable to adjust the characteristic control movement of the guide roll means.

Other important objects, features and advantages of the present invention will become apparent from the following detailed description of a preferred embodiment, in which:

FIGURE 1 is a side elevational view of an edge alignment mechanism in accordance with the present invention;

FIGURE 2 is a top plan view of the mechanism of FIGURE 1;

FIGURE 3 is a partial enlarged plan view of one end of the mechanism of FIGURE 1;

FIGURE 4 is a partial enlarged side elevational view of the structure of FIGURE 1;

FIGURE 5 is an enlarged end view of the structure of FIGURE 1;

FIGURE 6 is a diagrammatic view of the hydraulic control circuit for the mechanism of FIGURE 1.

FIGURE 7 is a diagrammatic plan view of the edge alignment mechanism of FIGURE 1 showing the position of the roller when radius arms have parallel relation in the neutral position;

FIGURE 7A is a diagrammatic elevated view of the edge alignment mechanism of FIGURE 1 showing the position of the roller when radius arms have parallel relation in the neutral position;

FIGURE 8 is a diagrammatic plan view of the edge alignment mechanism of FIGURE 1 showing the position of the roller when neutrally parallel radius arms are moved to the left;

FIGURE 8A is a diagrammatic elevated view of the edge alignment mechanism of FIGURE 1 showing the position of the roller when neutrally parallel radius arms are moved to the left;

FIGURE 9 is a diagrammatic plan view of the edge alignment mechanism of FIGURE 1 showing the position of the roller when neutrally parallel radius arms are moved to the right;

FIGURE 9A is a diagrammatic elevated view of the edge alignment mechanism of FIGURE 1 showing the position of the roller when neutrally parallel radius arms are moved to the right;

FIGURE 10 is a diagrammatic plan view of the edge alignment mechanism of FIGURE 1 showing the position of the roller when radius arms have an inwardly relation in the neutral position;

FIGURE 10A is a diagrammatic elevated view of the edge alignment mechanism of FIGURE 1 showing the position of the roller when radius arms have an inwardly relation in the neutral position;

FIGURE 11 is a diagrammatic plan view of the edge alignment mechanism of FIGURE 1 showing the position of the roller when neutrally inward radius arms are moved to the left;

FIGURE 11A is a diagrammatic elevated view of the edge alignment mechanism of FIGURE 1 showing the position of the roller when neutrally inward radius arms are moved to the left;

FIGURE 12 is a diagrammatic plan view of the edge alignment mechanism of FIGURE 1 showing the position of the roller when neutrally inward radius arms are moved to the right;

FIGURE 12A is a diagrammatic elevated view of the edge alignment mechanism of FIGURE 1 showing the position of the roller when neutrally inward radius arms are moved to the right;

FIGURE 13 is a diagrammatic plan view of the edge alignment mechanism of FIGURE 1 showing the position of the roller when radius arms have an outward relation in the neutral position;

FIGURE 13A is a diagrammatic elevated view of the edge alignment mechanism of FIGURE 1 showing the position of the roller when radius arms have an outward relation in the neutral position;

FIGURE 14 is a diagrammatic plan view of the edge alignment mechanism of FIGURE 1 showing the position of the roller when neutrally outward radius arms are moved to the right;

FIGURE 14A is a diagrammatic elevated view of the edge alignment mechanism of FIGURE 1 showing the position of the roller when neutrally outward radius arms are moved to the right;

FIGURE 15 is a diagrammatic plan view of the edge alignment mechanism of FIGURE 1 showing the position of the roller when neutrally outward radius arms are moved to the left; and FIGURE 15A is a diagrammatic elevated view of the edge alignment mechanism of FIGURE 1 showing the position of the roller when neutrally outward radius arms are moved to the left.

As shown on the drawings:

Referring to FIGURES 1 and 2, it will be observed that in the illustrated embodiment a roll 10 is mounted for rotation on a central longitudinal axis by means of bearings 11 and 12 carried by respective radius arm structures designated generally by the reference numerals 13 and 14. The radius arm structures 13 and 14 include mounting members 15 and 16 providing for pivotal movement of the arm structures 13 and 14 in respective directions such as indicated by arrows 17 and 18 in FIGURE 2 forming respective acute angles with respect to the direction of movement of a web over the roller 10 which is indicated by the arrow 19.

As seen in FIGURE 5, a web 20 is guided by any suitable means such as indicated generally at 21 and 22 about a portion of the periphery of the guide roller 10. The means 21 and 22 inherently constrain the web 20 so that only a limited length of the web 20 extends between the means 21 and 22 at any given instant of time.

The roll 10 may be shifted in a clockwise rotational direction as viewed in FIGURE 2 so that the right end of the roll as viewed in FIGURE 2 is at a position such as indicated at 10a while the left end of the roll is at a position such as indicated at 10b. Conversely, the roll 10 may be shifted in the opposite rotational direction which is counterclockwise as viewed in FIGURE 2 so that the righthand end of the roll 10 moves in the direction of web travel to a position such as indicated at 10c while the opposite end is shifted in the direction opposite to the direction of web travel to a position such as indicated at 10d. It will be observed in FIGURE 2 that as the roll 10 is shifted rotationally it is also shifted laterally from a neutral position such as shown in solid outline in FIGURE 2 (where the roll 10 has its axis at right angles to the direction of web movement indicated by arrow 19). Thus, if the roll 10 is shifted to the right to a position such as indicated in dash outline at 10a, 10b, the web will be shifted to the right also. If the roll 10 is simultaneously shifted in a clockwise direction as viewed in FIGURE 2, this rotational shifting of the roll will also tend to drive the web to the right as viewed in FIGURE 2 tending to correct for a tendency of the web to move to the left with respect to its desired position. Similarly, shifting of the roll 10 from its neutral position to a left hand position such as indicated at 10c, 10d in FIGURE 2 will move the web 20 to the left and tend to maintain the web in the correct position.

A suitable edge positioning sensing mechanism may cooperate with the web 20 to define a desired position of the web or a neutral range of permissible positions. An edge sensing device which may be used for this purpose is the subject of my copending application Ser. No. 280,620, filed May 15, 1963, and the details of the particular edge alignment system illustrated in said copending application are incorporated herein by reference as an example of a particularly suitable control system for association with the roll 10 in controlling the lateral position of the web 20. Of course, any suitable conventional edge alignment control system may control the lateral and rotational shifting of the roll 10 to control the position of the web 20, and the position of the edge sensing device along the path of the web will vary depending upon the application of the system.

Referring to FIGURE 1, it will be observed that the shifting movement of the roll 10 is indicated as being controlled by means of a power actuating device 40 coupled to the radius arm 14. As indicated in FIGURE 5, the power actuating device 40 may have its operating axis aligned with the axis of roll 10 in its neutral position corresponding to the position shown in solid outline in FIGURE 2. The housing 41 of actuator 40 may be pivotally connected with a post 42 by means of a horizontal pin 38, and the post 42 may swivel in its mounting socket 39 on a vertical axis to accommodate movement of reciprocating part 43 of actuator 40 in a straight axial direction at all times with respect to the housing 40. In the illustrated embodiment, mounting devices 15, 16 and 39 have been shown as being secured to a common base plate 50, but it is contemplated that these parts may be secured directly to the machine frame of a paper machine, for example, under certain circumstances.

By way of specific exemplary details, it may be noted that the radius arm structure 14, FIGURE 4, may comprise a member 51 having an end portion with flats such as indicated at 51a fitting between a pair of upstanding flange parts such as 16a of pivot mount 16. The pivot mount 16a is provided with a shaft 52 extending through the flanges thereof and through a hole in the lower end of member 51. The flanges of mount 16 may have ball bearings 44 and 45 therein journalling the shaft 52. The shaft is retained against substantial axial movement by means of nuts 46, 47 and 48, 49 and washers 54 and 55. A set screw is provided as indicated at 53 to secure the lower end of member 51 to the shaft 52 so that the member 51 is centered between the flanges such as 16a of mount 16. The structure of pivot mount 15 is of course similar.

The angular adjustment of the mounting blocks 15 and 16 is accomplished by loosening the socket head securing screws 57 and 58, which are located in the mounting holes 56 and 60, respectively, FIGURES 2, 4 and 5, making the angular adjustments, and then retightening the screws 57 and 58 to clamp the blocks 15 and 16 in the desired angular positions with respect to plate 50.

As shown in FIGURE 7, the positional adjustment of the mounting blocks 15 and 16 can be made by unscrewing the screws 57 and 58 and moving the blocks inward or outward to either mounting holes 61 and 62 or mounting holes 64 and 65 and securing the mounting blocks 15 and 16 by the screws 57 and 58 through either mounting holes 61–62 or mounting holes 63–64, respectively.

The upper end of the member 51 has a threaded bore receiving one threaded end of a stud member 62, FIGURE 5, having its opposite threaded end threaded into a sleeve member 63. The member 62 has a smooth cylindrical central portion extending through a rod end 75 secured to the actuator part 43, FIGURE 1.

By way of example, rod end 75 may be of a commercially available type comprising a single hardened ball 80, precision ground and lapped, and bored through its center to accept the cylindrical portion of stud member 62. The head 75a of a part 75 may be made of carbon steel and have a generally cylindrical configuration. The ball 80 is retained in the generally cylindrical aperture of member 75 by means of a pair of bearing bronze inserts or rings inserted into the aperture from opposite sides of the ball and expanded into interlocking relation with the outer member 75a. The interior surfaces of the inserts generally conform to the exterior generally fragmental spherical surface of the ball 80 to accommodate universal pivotal movement of the coupling member 75 relative to the stud member 62.

The journal member 12 has a threaded shank 12a extending into an opposite end of the threaded sleeve 63 and locked therewith by means of the nut 90. The member 12 may comprise a rod end similar to the member 75 and having a ball part 92 with an interior cylindrical bore receiving a shaft part 93 of roll 10 which is secured with the journal member 12 by means of nuts 95 and 96, FIGURES 3, 4 and 5. The spherical type joint between journal member 12 and roll shaft 93 enables the radius arm 14 to pivot in a plane such as represented by the line of arrow 17 in FIGURE 2. Inserts lock the ball 92 in the journal member and provide interior fragmental surfaces conforming with the fragmental spherical surface of the ball 92 as with member 75.

The journal member 11 may be identical to the member 12 and have a similar universal ball and socket connection with roll shaft part 97 and have a similar threaded connection with a sleeve part 98 of radius arm 13. Nuts are indicated at 99 and 100 securing the shaft part 97 in assembly with journal member 11. The lower end of sleeve 98 may be pivotally carried on a shaft 52' associated with mount 15.

In the illustrated embodiment, angular adjustment of the pivotal mounting block 15 results in a slight enlongation or contraction of the effective length of the radius arm 13, but such changes in length are substantially negligible.

A sleeve member 101 is indicated in FIGURE 4 for coupling actuator part 43 with a threaded part 75b of rod end 75, nuts being indicated at 102 and 103 in FIGURE 1 for locking the parts at a desired adjustable length.

The actuating device 40 may be of a commercially available type and may be of the type having two pistons mounted on one common rod such as indicated at 43 so as to combine the advantages of an air operated valve-in-head cylinder indicated at 110 with the advantages of hydraulic control. The hydraulic fluid is used in a hydraulic cylinder 111 which is at the right as viewed in FIGURE 1, and accurate speed control is obtained by simply piping fluid to solenoid operated control valves such as indicated at 112 and 113 in FIGURE 6 in series with the actuating chambers 111a and 111b of the hydraulic cylinder. A small make-up reservoir is indicated at 114 in FIGURE 6 having a pressurized air head at 115 above the oil level. Electric solenoid control of the air valves controlling pressure in the air cylinder 110 may be obtained by means of solenoid coils in housing 114' and 115' seen in FIGURE 5. It will be apparent that the air valve solenoids may be actuated by the edge position sensing and control system illustrated in my copending application Serial No. 280,600 filed May 15, 1963, now Patent No. 3,243,993.

The hydraulic solenoid operated valves 112 and 113 have adjustable metering flow control orifices built into the body of the valves and these have been indicated diagrammatically at 112a and 113a in FIGURE 6. Valves 112 and 113 are leak proof only in the direction of flow away from the respective adjacent actuating chambers 111a and 111b so that two valves are utilized to positively lock piston rod 43 in a fixed position between corrective actuations of the roll 10. The solenoid coils controlling valves 112 and 113 are both energized whenever either of air valve solenoids are energized so that valves 112 and 113 always open and close together, and further valves 112 and 113 open whenever the air cylinder is activated and close whenever the air cylinder is deactivated.

By way of example, an error in one direction of the web may cause closure of a first electric switch controlling energization of a first air valve solenoid in housing 114'. A first relay having its energizing coil in series with this first air valve solenoid will cause energization of solenoid valves 112 and 113 upon closure of the first electric switch. The first air valve solenoid which is thus energized will connect air under pressure to a first actuating chamber of air cylinder 110 and connect the second opposite chamber to atmosphere. The roll 10 will then be shifted in a direction to correct for the error and the rate of shifting of the roll 10 will be determined by flow control orifices 112a and 113a of valves 112 and 113. When the web reaches the desired position, the electric switch will open, deenergizing the first air valve solenoid and deenergizing valves 112 and 113 to hydraulically lock the roll in the new position. Similarly an error in web position in an opposite direction will cause closure of a second electric switch controlling energization of the second air valve solenoid in housing 115'. A second relay in series with the second air valve solenoid may cause energization of solenoid valves 112 and 113. Air under pressure is now supplied to the second actuating chamber of air cylinder 110 and the first actuating chamber will be vented to atmosphere to produce shifting of roll 10 in the opposite direction.

The foregoing details have been given simply by way of example to illustrate a preferred mode of construction, and not by way of limitation.

As a further example of a suitable actuating mechanism for the roll 10, a gear head air motor may be substituted for the actuator 40 specifically illustrated in the drawings. The gear head air motor may be of the type manufactured by the Gast Manufacturing Company. This motor starts and stops very rapidly, it has high antifriction thrust when used with a ball screw and yet the ball screw will lock the mechanism in the off condition of the motor so as to eliminate the need for a hydraulic lock-up circuit such as indicated in FIGURE 6. As another example, a small reversing type gear head motor may be used with a built-in brake which would also be used in conjunction with a ball screw type coupling with the pivotal mounting arm 14 of the roll 10.

While a single roll 10 has been shown in the illustrated embodiment, as another example, a twin roll arrangement may be utilized with the web weaving between the two rolls and making the conventional S wrap with respect thereto. By way of example, the pair of guide rolls may have their axes parallel and in a common horizontal plane and mounted in respective bearings such as indicated at 11 and 12 in FIGURE 1. The two bearings at the opposite ends of the pair of rolls could be secured to a common support similar to the supports 13 and 14 shown in FIGURE 1 so that the two guide rolls would have a fixed spacing and fixed parallel relationship throughout the range of pivotal movement of the mounting arms therefor.

The mounting blocks 15 and 16 may be secured directly to the side frames of a paper machine or the like with which the web 20 is associated. The actuating mechanism 40 could also be secured directly to the machine side frame and arranged to actuate a simple crank with the axis of the actuating mechanism 40 arranged vertically, for example and driving a universal coupling part such as indicated at 75 horizontally in a direction parallel to the direction of web movement by means of the crank.

Also, the mounting blocks 15 and 16, as shown in FIGURE 7, may be secured in one of several positions depending on the roll movement desired. As shown in FIGURES 10, 10A, 11, 11A, 12, 12A, 13, 13A, 14, 14A, 15 and 15A, the resulting drop of either end of the roll 10 is determined by the degree in which the mounting blocks 15 and 16 are moved toward or away from the center position of the roll 10. Therefore, dimensional movement of the radius arms 13 and 14 and the roll 10 will not be discussed for the alternate positions of the mounting blocks 15 and 16.

Example of operation

In a practical arrangement in accordance with the present invention, the radius between the axis of shaft 52 and the axis of the roll 10 is of the order of seven inches. The range of positions indicated at 10a, 10b and 10c, 10d in FIGURE 2 may correspond to arcuate movement of the radius arm structures 13 and 14 through angles of approximately 25° in the planes of pivotal movement coinciding with the lines of arrows 17 and 18 in FIGURE 2. By way of example, with a six inch effective radius of the radius arms 13 and 14, one inch of edge alignment movement of the bearings 11, 12 in the direction of arrows 17, 18 and as measured in the plane of FIGURE 2 results in a drop of the roll 10 of 1/32 of an inch in a direction to relieve tension on the portion of the web 20 between drive means 21 and 22 as seen in FIGURE 5. Two inches of such edge alignment movement of the roll bearings 11 and 12 results in a drop of the roll of 3/32 of an inch, and three inches of edge alignment movement causes a drop of the roll 10 of 3/16 inch. For practical purposes, the roll stays substantially at a constant elevation or position relative to the normal web path shown in FIGURE 5 with the roll 10 in its central or neutral position, except for relatively extreme edge control movements of the roll such as of the order of three inches. As the roll movement approaches its opposite limits such as indicated at 10a, 10b and 10c, 10d, which corresponds to a relatively severe misalignment of the web with respect to its desired position, the tension of the portion of the web instantaneously travelling over the guide roll means 10 is effectively reduced by movement of the guide roll means 10 in a direction to relieve web tension. This tension relieving movement of the roll is sufficient to substantially reduce the danger of tearing or snapping of the web such as may otherwise occur particularly at the extremes of edge alignment corrective shifting of the roll means.

When the mounting blocks 15 and 16 are secured in a neutrally inward direction on the base plate 50, as shown in FIGURE 10, the relative motions obtainable by the radius arms 13 and 14 are different than those obtained when the radius arms 13 and 14 are secured in a neutrally parallel relation, as shown in FIGURE 7. When the actuator 40 moves the radius arms 13 and 14 in the direction indicated by the arrow 65, FIGURE 11A, the end of the roll 10 which is connected to the radius arm 13 will move downward and outward, and the end of the roll 10 connected to the radius arm 14 will move upward and inward as shown in FIGURES 11 and 11A. By this arrangement, the end of the roll 10 connected to the radius arm 13 is dropping at a faster rate than the end connected to the radius arm 14 is rising. When the actuator 40 moves the radius arms 13 and 14 in the direction indicated by the arrow 66, FIGURE 12A, the end of the roll 10 connected to the radius arm 14 will move downward and outward, while the end of the roll 10 connected to radius arm 13 will move upward and inward. Also in this instance, the side which is moving downward is moving at a faster rate than the side which is moving upward, as shown in FIGURES 12 and 12A.

When the mounting blocks 15 and 16 are secured in an outwardly fashion on the base plate 50, as shown in FIGURE 13, the relative motion of the roll 10 is again different from that obtained when the radius arms 13 and 14 are in the positions shown in FIGURES 7 and 10. When the actuator 40 moves the radius arms 13 and 14 in the direction indicated by the arrow 67, FIGURE 14A, the end of the roll 10 connected to the radius arm 14 is moved in an upwardly and outwardly direction, while the end of the roll 10 connected to the radius arm 13 will move in a downward and inward direction, as shown in FIGURES 14 and 14A. When the actuator 40 moves the radius arms 13 and 14 in the direction shown by the arrow 68, FIGURE 15A, the end of the roll 10 connected to the radius arm 14 will move in a downward and inward direction, while the end of the roll 10 connected to the radius arm 13 will move in an upward and outward direction, as shown in FIGURES 15 and 15A.

Therefore, by securing the mountings block 15 and 16 in different relative positions, with respect to the roll 10 and the radius arms 13 and 14, a wide range of roll movements is obtained and the utility of the edge alignment mechanism is greatly extended.

It will be apparent that many modifications and variations may be effected without departing from the scope of the novel concepts of the present invention.

I claim as my invention:

1. In combination in web control apparatus, guide roll means for receiving a moving web under a tension such that lateral and rotational shifting of the guide roll means tend to shift the web in the corresponding lateral direction, radius arms mounting opposite ends of said guide roll means, and means mounting said radius arms for pivotal movement in respective planes disposed at acute angles with respect to the direction of web movement across said guide roll means so that pivotal movement of said radius arms simultaneously shifts said guide roll means laterally and rotates the guide roll means in such a direction as to tend to drive the web in the direction of lateral shifting of the guide roll means, said mounting means being capable of being secured in respective ones of a plurality of positions for effecting the movement of said guide roll means.

2. In combination in web control apparatus, guide roll means for receiving a moving web thereacross under a tension such that lateral and rotational shifting of the guide roll means in a single plane in respective opposite senses from a neutral position tends to shift the web in respective opposite lateral directions, means mounting said guide roll means for lateral and rotational shiftng movement from said neutral position in said respective opposite senses with substantial components of said movement lying in said single plane but with a further component of said movement being in a tension relieving direction at right angles to said single plane and in a direction to relieve tension of the web as the web is shifted laterally and rotationally by said guide means, said mounting means comprising radius arms each having one end pivotally secured to a respective one of the opposite ends of said guide roll means, and means pivotally mounting the opposite ends of said arms for pivotal movement of said arms in respective planes forming opposite acute angles to the direction of web movement, the guide roll means in neutral position thereof extending at right angles to the direction of movement of the web with the radius arms being disposed at an angle to said single plane.

3. In combination in web control apparatus, web guide means for receiving a moving web in contact therewith and for controlling the lateral position of the web by lateral shifting movement thereof, and means mounting said web guide means for shifting movement in a lateral direction to shift the lateral position of the web and for shifting in a different direction a distance approximately equal to the distance of said lateral direction to reduce the tension of the web near the limit of lateral shifting movement of the web guide means.

4. In combination in web control apparatus, guide roll means for receiving a moving web under a tension such that lateral and rotational shifting of the guide roll means tends to shift the web in the corresponding lateral direction, radius arms mounting opposite ends of said guide roll means, said radius arms being inwardly and outwardly adjustable with respect to the center of said roll means when said roll means is in a neutral positon, and means mounting said radius arms for pivotal movement in respective planes disposed at acute angles with respect to the direction of web movement across said guide roll means so that pivotal movement of said radius arms simultaneously shifts said guide roll means laterally and rotates the guide roll means in such a direction as to tend to drive the web in the direction of lateral shifting of the guide roll means.

References Cited by the Examiner

UNITED STATES PATENTS 3,107,036  10/1963  Richards et al. ____ 226—19 X

M. HENSON WOOD, Jr., *Primary Examiner.*

ALLEN N. KNOWLES, *Examiner.*